United States Patent [19]

Wem et al.

[11] Patent Number: 4,692,283
[45] Date of Patent: Sep. 8, 1987

[54] CENTRIFUGAL GAS-LIQUID CONTACT APPARATUS

[75] Inventors: James Wem, Marton; Rowland J. P. Brierley, Yarm, both of England

[73] Assignee: Imperial Chemical Industries plc, London, England

[21] Appl. No.: 912,661

[22] Filed: Sep. 29, 1986

Related U.S. Application Data

[63] Continuation of Ser. No. 435,302, Oct. 19, 1982, abandoned.

[30] Foreign Application Priority Data

Oct. 26, 1981 [GB] United Kingdom ............... 8132249

[51] Int. Cl.⁴ .............................................. B01F 3/04
[52] U.S. Cl. .................................................... 261/89
[58] Field of Search ................................ 261/88–90, 261/92; 366/101, 102, 279, 325; 210/321.1

[56] References Cited

U.S. PATENT DOCUMENTS

| | | | |
|---|---|---|---|
| 689,246 | 12/1901 | Theisen | 261/89 X |
| 789,247 | 5/1905 | Zellweger | 261/89 |
| 1,843,647 | 2/1932 | Bramley-Moore | 261/92 |
| 1,953,537 | 4/1934 | Miller et al. | 261/92 |
| 2,259,762 | 10/1941 | McKee | 261/90 X |
| 2,941,872 | 6/1960 | Pilo et al. | 261/89 X |
| 3,486,743 | 12/1969 | Todd | 261/83 |
| 3,779,452 | 12/1973 | Nau et al. | 55/337 X |
| 4,283,255 | 8/1981 | Ramshaw et al. | 261/89 X |
| 4,382,045 | 5/1983 | Wem | 261/89 |
| 4,400,275 | 8/1983 | Ramshaw et al. | 210/321.1 |

FOREIGN PATENT DOCUMENTS

| | | | |
|---|---|---|---|
| 20055 | 12/1980 | European Pat. Off. | |
| 2446089 | 4/1976 | Fed. Rep. of Germany | |
| 859097 | 1/1961 | United Kingdom | 261/89 |
| 2024644 | 1/1980 | United Kingdom | |
| 850106 | 7/1981 | U.S.S.R. | 261/89 |

*Primary Examiner*—Richard L. Chiesa
*Attorney, Agent, or Firm*—Cushman, Darby & Cushman

[57] ABSTRACT

A gas-liquid contact apparatus includes a rotor having an outer wall parallel to the axis of rotation of the rotor, a permeable element mounted within the rotor for rotation therewith, inlets to supply liquid and gas to the rotor and outlets for conducting a gas and liquid respectively from the rotor. The permeable element is made of a plurality of strips of permeable material in layers superimposed progressively from the outer wall inwards towards the axis of rotation, the strips being in end-to-end abutment and the abutments being circumferentially staggered in adjacent layers.

1 Claim, 3 Drawing Figures

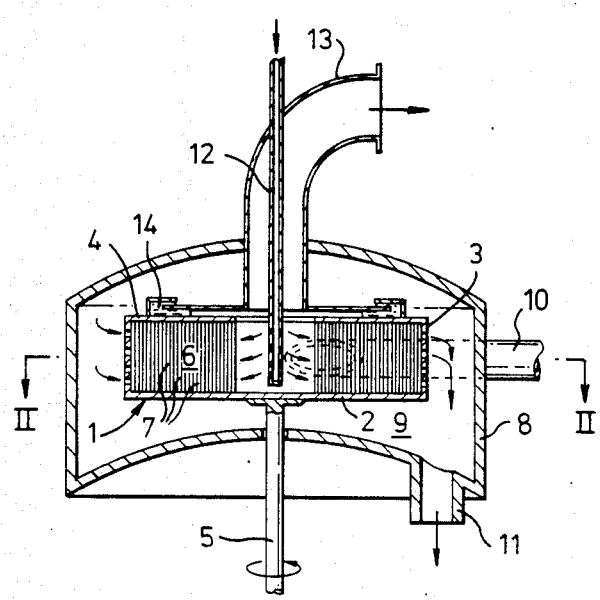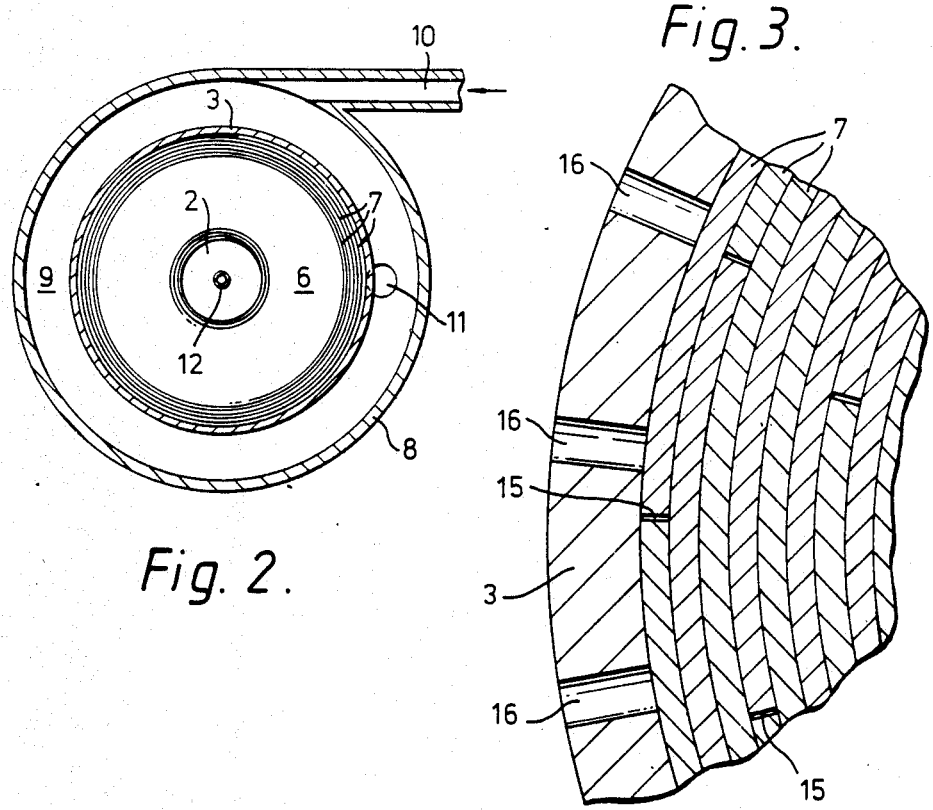

CENTRIFUGAL GAS-LIQUID CONTACT APPARATUS

This is a continuation of application Ser. No. 435,302, filed Oct. 19, 1982, which was abandoned upon the filing hereof.

This invention is concerned with centrifugal gas-liquid contact apparatus. Throughout this patent specification, the word "gas" is intended to include also vapours.

Various centrifugal devices for gas-liquid contacting have been proposed, including that described in UK Pat. No. 757,149 of Claes Wilhelm Pilo. More recently, we have ourselves described in European Patent Publication No. 0,002,568 a centrifugal gas-liquid contact apparatus having a permeable element, in the pores of which the gas and liquid are brought into contact. We have described various forms which the permeable element may take, including knitted or woven fibres (for example the knitted metal fibre product sold under the Registered Trade Mark "KNITMESH"; fibre aggregates such as non-woven fabric; skeletal foam, in particular metallic skeletal foam such as that sold under the Registered Trade Mark "RETIMET"; and cast blocks having pores formed during casting or subsequent to casting.

It will be readily understood that the structural form of the permeable element is important not only from the point of view of efficient mass transfer between the gas and the liquid but also, especially on the industrial scale, from the standpoint of the stability of the apparatus. It is necessary not only that the element should remain stable in operation of the apparatus but also that it may without undue difficulty be mounted or formed within the apparatus so as to be symmetrically balanced about the axis of rotation. If the element is in the form of discrete particles, stability during operation is less readily achieved but if the element is a unitary mass, for example a cast block, then symmetry is less easy to achieve.

We have now devised a form of permeable element which more readily meets the combined needs of stability in use and dimensional symmetry. The element takes the form of one or more strips of permeable material mounted progressively inwardly towards the axis of rotation.

Our invention is therefore an improvement in gas-liquid contact apparatus of the type which comprises a rotor having an outer wall parallel to the axis of rotation of the rotor, a permeable element mounted within the rotor for rotation therewith, means to supply liquid and gas to the rotor and means for conducting gas and liquid respectively from the rotor; according to the improvement the permeable element is one or more strips of permeable material in layers superimposed progressively from the outer wall inwards towards the axis or rotation.

The one or more strips may comprises any material which is permeable to the liquid and gas, especially any material which has pores which present a tortuous path to the liquid and gas. As will be clear from our own earlier European Patent Publication Nos. 0,002,568 and 0,020,055, a range of materials are suitable for this purpose, especially preferred being materials of at least 80% voidage and materials comprising strands, fibres or filaments, among which we more especially prefer the above-mentioned products sold under the respective Registered Trade Marks of "KNITMESH" and "RETIMET".

For convenience, the one or more strips may usefully be as wide (that is, at right angles to their length) as the axial depth of the outer wall of the rotor, since thereby circumferential gaps between strips may be avoided. Such gaps can provide an unduly easy path for the liquid and gas as they flow through the permeable element during operation of the apparatus, thus reducing the effectiveness of the gas/liquid contacting. However, strips of narrower width may be used if desired, for example if the permeable material is not readily available in the preferred width. If such narrower width is used, then axial overlapping of strips in adjacent layers will advantageously interrupt the easy fluid path.

The one or more strips of permeable material may be a single continuous strip or a number of shorter strips in circumferentially overlapping or preferably end-to-end abutment. Since a single continuous strip would normally need to be of a length which is several times as long as the circumference of the rotor, packing of the permeable material is more readily achieved by the use of a number of shorter strips. Because the centrifugal effect of the rotation of the rotor presses the strips against the inner face of the outer wall of the rotor, it is not essential that the strips be secured together. However, greater overall stability of the element in use may be achieved if desired by securing together circumferentially adjacent strips and/or adjacent layers.

If the permeable element is assembled from a number of strips, then it is desirable that steps be taken to ensure that junctions between adjacent strips do not combine to form an easy path for the gas or liquid through the element. This may be achieved by overlapping the ends of adjacent strips but, since this leads to irregularities in the structure of the permeable element, it is preferred simply to arrange that junctions in adjacent layers be staggered circumferentially.

The element, as indicated, is formed by superimposing layers progressively towards the axis. Whether a single continuous strip of a number of strips is chosen, the element may be formed as a continuous spiral. Alternatively, it may take the form of a plurality of discrete concentric layers. If a structure of concentric layers is chosen, then clearly it will be necessary to use strips of different length from one layer to the next, as the circumferential lengths of the layers become progressively less towards the axis. Thus this structure is more time-consuming to assemble but it is marginally more symmetrical about the axis than a spiral structure.

If the spiral structure is chosen, the overall symmetry—and therefore the balance—of the permeable element may be improved by employing a strip or strips of tapered thickness adjacent one or both ends of the spiral.

Also if the spiral structure is chosen, then it is preferred that the direction of wind of the spiral, that is clockwise or anti-clockwise, be such that rotation of the rotor in operation of the apparatus will tighten the spiral packing towards the outer wall. Therefore, if the rotor is designed to rotate in a clockwise direction, the spiral is preferably wound in an anti-clockwise direction from the outer wall inwards. This arrangement has the added advantage that any liquid following the easier path around the spiral between adjacent layers instead of passing through the layers, is moved towards the centre of the element and therefore does not by-pass the gas-liquid contact treatment but is returned to the centre for treatment.

The outer wall of the rotor functions to retain the permeable element against the outward centrifugal effect arising from rotation of the rotor. Suitable such outer walls have been well described in our earlier patent specifications, for example in European Patent specification No. 0,047,085, and need not be described here. However, it may be mentioned that the outer wall may be discontinuous, for example a row of bolts located around the circumference of the rotor, or may itself be a strip of permeable material of sufficient strength to withstand the centrifugal forces arising in operation of the apparatus, or a combination of one or more strips of permeable material with bolts so located as to give radial support to the one or more strips.

BRIEF DESCRIPTION OF THE DRAWINGS

The invention will now be further described by reference to the accompanying drawings, in which:

FIG. 1 is a simplified sectional view of centrifugal gas-liquid contact apparatus according to the present invention;

FIG. 2 is a sectional view along the line II—II of FIG. 1; and

FIG. 3 is a detail on a larger scale of a part of FIG. 2.

DETAILED DESCRIPTION OF THE DRAWINGS

Referring firstly to FIGS. 1 and 2, a rotor 1 comprising a base 2, a cylindrical outer wall 3 and an annular top 4 is mounted upon shaft 5 by means of which it is rotated in an anti-clockwise direction. Mounted symmetrically about the axis of rotation of the rotor 1, and within the rotor, is an annular permeable element 6 in the form of superimposed layers 7 of a permeable material. The permeable material employed in the embodiment is the metallic skeletal foam sold under the Registered Trade Mark "RETIMET".

The rotor 1 is axially disposed within a generally cylindrical container 8, defining a chamber 9 and provided with conduits 10 and 11 for the introduction of gas and the removal of liquid respectively from the chamber 9. Liquid is introduced to the apparatus via liquid feed pipe 12, disposed axially with respect to the container 8 and concentric, for a part of its length, with a gas discharge pipe 13.

In operation of the apparatus, liquid supplied by feed pipe 12 is sprayed via apertures in the lower end of pipe 12 on to the inner face of the permeable element 6, through which it permeates in a generally outward direction under the influence of the centrifugal effect arising from rotation of the rotor 1. Within the pores of the element 6, the liquid meets a countercurrent flow of gas, with which it is repeatedly contacted until the liquid emerges, via apertures 16 in the outer wall 3 of the rotor 1, into the chamber 9, from which it is drained via liquid removal conduit 11. Gas enters the apparatus via gas feed pipe 10, flows under pressure generally inwardly through the element 6, emerging at the inner face of the element 6 and leaving the apparatus via gas discharge pipe 13. By-passing of the element by the gas is prevented by means of a liquid seal 14.

The "RETIMET" metallic skeletal foam of which the permeable element 6 is formed is assembled in situ within the rotor 1 from strips of material. These "Retimet" strips are as wide as the axial depth of the rotor 1 and are, in the illustrated embodiment, less long than the circumference of the rotor. Thus for a rotor of say 2 to 4 meters circumference, the strips may be of the order of say 0.5 to 1.5 meters in length. The thickness of the strips is a fraction of the radius of the rotor, for example 1 to 10 mm, especially 2 to 5 mm.

To form the permeable element, the strips are mounted within the rotor in layers superimposed towards the centre of the rotor. Thus the first strip is placed in contact with the inner face of the outer wall 3 of the rotor and the second and subsequent strips are abutted, end-to-end, successively around the circumference of the rotor and in overlapping layers towards the centre of the rotor.

If desired, appropriate strips may be cut to length before installation in the rotor, the length being such that groups of strips form closed cylindrical layers, each cut strip completing a layer. However, it is more straightforward and therefore preferred, to build up the element in the form of a continuous spiral, which in the illustrated embodiment runs in a clockwise direction towards the centre (that is, in the opposite direction to the rotation of the rotor). Whichever arrangement is adopted, that is spiral or concentric cylinders, it is ensured, if necessary by cutting appropriate strips, that the joins 15 between adjacent strips are staggered circumferentially about the rotor, to avoid forming a continuous path of easy flow for the liquid through the permeable element 6. Advantageously, the length and disposition of the strips is so chosen that joins 15 in the outermost layer do not coincide with any of the apertures 16 in the outer wall 3 of the rotor 1.

An important advantage of the present invention is that it affords the possibility of assembling in situ, stable permeable elements of a range of annular sizes. Once packed, even without the joining together of adjacent strips, the element may be wholly stable in use by virtue of the rotation of the rotor. However, extra stability, if desired, may be achieved by the use of suitable supports or retainers. Thus, for example, a perforated or permeable annular retainer may be mounted against the radially inner face of the permeable element in order to provide additional support for the element, especially while the rotor is stationary. Alternatively or in addition, the innermost and/or outermost layers of the permeable element may be of greater radial thickness than the other layers.

Another important advantage of the present invention is that it allows the permeable element to be formed from more than one material, for example from layers of "RETIMET" metallic skeletal foam retained in place by one or more layers of "KNITMESH" metallic fabric, or from different grades of the same material, for example from "RETIMET" foams of different pore size. It is a feature of any uniform annular permeable element that the cross-sectional area through which the liquid flows increases at increased radial distance from the axis of rotation. By using different materials or different grades of the same material in different layers, the effects of the change in cross-sectional area may be at least partially compensated. Thus the hydraulic capacity of the inner layers may be maintained without sacrifice of the gas-liquid contacting efficiency of the outer layers, by using for example "RETIMET" foam of coarser pore size towards the radially inner face of the permeable element.

What is claimed is:

1. Gas-liquid contact apparatus comprising a rotor having a generally cylindrical outer wall parallel to the axis of rotation of said rotor, a permeable element mounted within the rotor for rotation therewith, means to supply liquid and gas to the rotor and means for conducting gas and liquid respectively from the rotor, said permeable element being a plurality of strips of permeable material selected from the group consisting of knitted fabrics, woven fabrics, non-woven fabrics and skeletal foams, superimposed progressively from the outer wall inwards towards said axis of rotation and together forming a plurality of discrete concentric layers in contact with each other, the strips having a width substantially equal to the axial depth of the rotor and having a length less than the circumferential length of the outer wall of the rotor, the strips being in end-to-end abutment, and th abutments being staggered circumferentially in adjacent layers, said strips forming a permeable element which is stable in use.

* * * * *